3,102,079
METHOD FOR MANUFACTURING XANTHOSINE BY FERMENTATION

Shukuo Kinoshita, Tokyo, Kiyoshi Nakayama, Sagamihara-shi, and Takeo Suzuki and Zenroku Sato, Tokyo, Japan, assignors to Kyowa Hakko Kogyo Co., Ltd., Tokyo, Japan, a corporation of Japan
No Drawing. Filed Aug. 2, 1961, Ser. No. 128,696
Claims priority, application Japan Nov. 21, 1960
4 Claims. (Cl. 195—42)

This invention is concerned with a fermentation process for preparing xanthosine which comprises cultivating a guanine-requiring mutant strain of *Aerobacter aerogenes* in a nutrient medium and recovering thus produced and accumulated xanthosine from the said medium.

Xanthosine is an important material for biosynthesis of nucleic acid, and its 5'-phosphoric acid ester is reported [A. Kuninaka, "Nippon Nogeikagaku Kaishi," volume 34, pp. 489 to 492 (1960)] as having a remarkable seasoning action. Xanthosine may be prepared by a chemical synthetic method, but the process is so complicated and the yield is so poor that the method is not adequate for the industrial scale production. Consequently, it has been prepared exclusively by the deamination of guanosine obtained by the decomposition of yeast nucleic acid, up to this time.

However, it is needless to say, if the xanthosine, the raw material of xanthosine phosphate having a good seasoning action, could be directly prepared by fermentation, the method should be extremely profitable in contrast with the conventional method which required complicated processes. The present inventors paid attention to the said point and studied about the manufacturing method of xanthosine by using microorganism. The inventors, in developing a commercially feasible method of manufacturing xanthosine by fermentation found that guanine-requiring mutants of *A. aerogenes* accumulate substantial amounts of xanthosine by the use of certain culture conditions. A living culture of a guanine-requiring mutant of *A. aerogenes* has been deposited in the American Type Culture Collection, Washington, D.C., where it has been given the accession number, ATCC 14304.

Such an auxotroph may be obtained by mutagenic treatment, such as irradiation with ultraviolet ray of γ-ray of $Co^{60}$, followed by selection with penicillin of a wild strain of *A. aerogenes*. This procedure is well known to those skilled in the art and commonly employed in the development and isolation of bacterial mutants.

The guanine-requiring mutant strain thus obtained by the said mutative treatment accumulates a lot of xanthosine in a culture medium. Furthermore, the mutant strain which requires not only guanine, but also other nutrients for its growth, the strain being obtained by performing the said treatment 2 or more times, can also accumulate xanthosine in the medium. Consequently, the guanine-requiring mutant strain of the present invention comprises not only the mutant strain requiring merely guanine for its growth, but also the strain which requires at least guanine and simultaneously other nutrients for its growth.

The method of this invention, as hereinabove described, can be achieved by cultivating a mutant strain of guanine-requiring *Aerobacter aerogenes* in nutrient media. An employed culture medium contains carbon source, nitrogen source, inorganic salts and other growth promoting agents sufficient to satisfy requirements of strains used. Maltose, lactose and sucrose are particularly suitable carbon sources, best results being obtained when they are employed. Glycerol, starch and sorbose may give a poor yield. Usually best results are obtained when employing from about 50 g. or more carbohydrate per liter of nutrient medium. The use of other concentrations of carbohydrate may lead to reduced yield of xanthosine.

As a nitrogen source, it may be possible to utilize ammonia, various inorganic and organic ammonium salts such as ammonium sulfate, ammonium chloride, ammonium nitrate, ammonium phosphate, ammonium carbonate, ammonium acetate and the like. Nitrates, urea and other nitrogen-containing material, and peptone, NZ-amine (Trypsin-hydrolyzed casein), meat extract, yeast extract, corn-steep-liquor and hydrolytic decomposition products of proteinous material such as casein, fishmeal, bean-meal, pupa, fermentation residue and the like may also be used. Particularly, ammonium sulfate, ammonium chloride, ammonium nitrate, ammonium phosphate etc. are superior to the others as a nitrogen source.

As is known in the art, the organism requires certain metallic ions for its growth, particularly potassium and magnesium ions which may be conveniently incorporated in the nutrient medium in the form of suitable soluble salts, for example, potassium mono- and dihydrogen phosphates and magnesium sulfate, respectively. Various trace metals, for example, iron, manganese and so forth, are also required for the organism's growth and may be incorporated into the nutrient medium by the addition of a premix of a suitable soluble form of these ions or preferably by the use of tap water, which contains these required ions, for the preparation of the nutrient medium.

Furthermore, a proper amount of nutrients necessary for is growth should be added to the culture medium according to the nutrient requirement of the microorganism to be employed. The microorganism employed in the present invention is a mutant strain which requires guanine for its growth, so that at least guanine itself, or guanine derivative (guanosine, guanylic acid and the like) and their nontoxic salts, such as hydrochloric acid salt, and material containing same, for example yeast extract, yeast hydrolyzate, fish soluble, hydrolyzate of microorganism cells and the like, should be added to the culture medium. The most favourable result is obtained when the amount of guanine in the culture medium is kept at the limitation level of less than the amount required for maximum growth of the microorganism, i.e. available guanine is about 30–100 microgram/ml.

The cultivation is usually carried out at a temperature between 20 to 40° C. under aerobic condition such as shaken culture and aerated and stirred submerged culture. In the course of the said cultivation the pH of culture medium is kept within the limits of about 5–8. When calcium carbonate is present in the culture medium at an extent of about 0.5 to 2.0%, a good accumulation of xanthosine can be obtained in the medium, and one reason thereof is presumed to be the pH control action of calcium carbonate.

The progress of the fermentation may be followed readily by taking samples from the fermentation liquors at periodic intervals and directly measuring its ultraviolet absorption spectrum, or more precisely by making the paper chromatography of the sample to cut off the xanthosine spot and measuring the ultraviolet absorption spectrum to analyze the amounts of xanthosine contained in the culture medium. Ordinarily, maximum accumulation of xanthosine may be reached after about 48 to 96 hours. After cultivation is over, the culture broth is filtered, the filtrate is condensed, alcohol is added step by step thereto, thus produced precipitate of impurity is filtered off, the filtrate is added with alcohol, cooled and allowed to stand to precipitate out xanthosine, and the crystalline xanthosine thus precipitated is recovered by an appropriate method, such as filtration. Another method is such that, the filtrate of culture medium is added with active carbon to make xanthosine adsorbed thereto, the carbon is treated with ammoniacal alcoholic water to extract the xanthosine, the extract is condensed, added with alcohol, cooled, and thus sedimented precipitate is filtered, dried to take xanthosine. Thus recovered xanthosine may if necessary be further recrystallized.

The present invention will more fully be explained with respect to the examples, which are provided merely by way of illustration and not by way of limitation. In fact, it may be possible to employ various modified methods without deviation from the spirit of the present invention.

*Example 1*

Aerobacter aerogenes No. 5301 (ATCC No. 14304) was inoculated into a culture medium comprising 2% glucose, 1% peptone, 0.5% meat extract and 0.25% table salt and cultured at 28° C. for 24 hours to prepare the seed culture.

The fermentation medium was prepared as follows: 50 g. of lactose, 10 g. of $(NH_4)_2SO_4$, 0.5 g. of $KH_2PO_4$, 0.5 g. of $K_2HPO_4$, 0.25 g. of $MgSO_4 \cdot 7H_2O$ and 74 mg. of guanine were dissolved in city water to make the volume of solution to be 1 liter. The solution was adjusted to pH 7.4 and each 30 ml. thereof was poured into respective 250 ml. conical flask. These flasks were sterilized and then 0.3 gram of sterilized $CaCO_3$ were added to the contents of each.

To the flasks which contain the fermentation medium thus prepared, 3 ml. of the said seed culture were inoculated and cultured under shaking at 28° C. After 96 hours, the accumulated amount of xanthosine in the culture medium was 4.7 mg./ml.

After termination of the cultivation, the culture medium was filtered to remove off the cells and remaining calcium carbonate, thus obtained 450 ml. of filtrate was condensed under vacuum to 70 mls., the precipitated calcium sulfate was removed off, the filtrate was added with 3 times volume of alcohol, filtered off the precipitate and the supernatant was stood for several days in a cooled room. Thus precipitated xanthosine crystal was filtered and dried. 610 mg. of white needle crystal were obtained.

This crystal was identified to be xanthosine by the results of elementary analysis, ultraviolet absorption curves of its acidic, neutral and alkaline aqueous solutions, quantitative analysis of ribose and base, and the result of its paper chromatography.

*Example 2*

As the fermentation medium, the following medium was prepared: 50 g. of glucose, 10 g. of $(NH_4)_2SO_4$, 1 g. of $K_2HPO_4$, 1 g. of $KH_2PO_4$, 0.25 g. of $MgSO_4 \cdot 7H_2O$ and 5 g. of yeast extract were dissolved into city water to make the volume of solution to be 1 liter. The solution was adjusted to pH 7.4 and added with sterilized $CaCO_3$ at the rate of 10 g. to the said solution 1 liter. The cultivation was carried out under the same conditions as those of Example 1 except for using the said fermentation medium.

After 72 hours' cultivation, the xanthosine contents of the culture medium reached to 4.0 mg./ml.

What we claim is:

1. A method of producing xanthosine which comprises (a) culturing at a temperature of from 20° to 40° C. a guanine requiring strain of Aerobacter aerogenes in a culture medium comprising carbon source, nitrogen source, inorganic salt and from about 30 to about 100 milligrams per liter of guanine, (b) maintaining the pH of the medium within the range of from 5 to 8 and (c) accumulating xanthosine in said medium.

2. A method for producing xanthosine which comprises (a) aerobically culturing Aerobacter aerogenes ATCC 14304 at a temperature within the range of from 20° to 40° C. in a culture medium containing carbon source, nitrogen source, inorganic salt and about 30 to 100 milligrams per liter of guanine, (b) maintaining the pH of the medium within the range of from 5 to 8 and (c) accumulating xanthosine in said medium.

3. A method for producing xanthosine which comprises (a) aerobically culturing Aerobacter aerogenes ATCC 14304 at a temperature within the range of from 20° to 40° C. in a culture medium containing carbon source, nitrogen source, inorganic salt and about 30 to 100 milligrams per liter of guanine as a member selected from the group consisting of guanine, guanosine, yeast extract, fish soluble and hydrolyzate of microorganism cells, (b) maintaining the pH of the medium within the range of from 5 to 8 and (c) accumulating xanthosine in said medium.

4. A method for producing xanthosine which comprises (a) aerobically culturing Aerobacter aerogenes ATCC 14304 at a temperature within the range of from 20° to 40° C. in a culture medium containing carbon source, nitrogen source, inorganic salt and about 30 to 100 milligrams per liter of guanine, (b) maintaining the pH of the medium within the range of from 5 to 8 by the addition of calcium carbonate to said medium and (c) accumulating xanthosine in said medium.

References Cited in the file of this patent

Journal of Biological Chemistry, vol. 226, pp. 351–363 (1956), Waverly Press, Baltimore, QP 501S7.

Advances in Enzymology (1959), vol. 21, pp. 199–261, article by Buchanan et al., Interscience Publishers Inc., N.Y.